(12) United States Patent
Wochnowski et al.

(10) Patent No.: US 6,949,272 B2
(45) Date of Patent: Sep. 27, 2005

(54) METHOD FOR PRODUCING A PERMANENT DEMOULDING LAYER BY PLASMA POLYMERIZATION ON THE SURFACE OF A MOULDED-PART TOOL, A MOULDED-PART TOOL PRODUCED BY SAID METHOD AND THE USE THEREOF

(75) Inventors: Horst Wochnowski, Norderstedt (DE); Holger Klyszcz-Nasko, Stuhr (DE); Alfred Baalmann, Osterhotz-Scharmbeck (DE); Klaus-D Vissing, Morsum (DE)

(73) Assignee: ACMOS Chemie GmbH & Co., Bremen (DE)

( * ) Notice: Subject to any disclaimer, the term of this patent is extended or adjusted under 35 U.S.C. 154(b) by 0 days.

(21) Appl. No.: 10/333,168

(22) PCT Filed: Jun. 5, 2001

(86) PCT No.: PCT/DE01/02112

§ 371 (c)(1),
(2), (4) Date: May 13, 2003

(87) PCT Pub. No.: WO02/05972

PCT Pub. Date: Jan. 24, 2002

(65) Prior Publication Data

US 2003/0175525 A1 Sep. 18, 2003

(30) Foreign Application Priority Data

Jul. 17, 2000 (DE) ......................... 100 34 737

(51) Int. Cl.$^7$ .................................................. C08J 7/18
(52) U.S. Cl. ......................... 427/489; 428/447; 528/42; 427/490
(58) Field of Search ................................. 427/489, 490; 428/447; 528/42

(56) References Cited

U.S. PATENT DOCUMENTS

| | | | |
|---|---|---|---|
| 5,316,716 A | 5/1994 | Sato et al. | 264/338 |
| 6,051,321 A | * 4/2000 | Lee et al. | 428/447 |

FOREIGN PATENT DOCUMENTS

| | | |
|---|---|---|
| DE | 44 17 235 A1 | 11/1994 |
| DE | 196 14 557 A1 | 10/1997 |
| EP | 374 080 A1 | 6/1990 |
| EP | 570 944 A1 | 11/1993 |
| EP | 841 140 A3 | 5/1998 |
| EP | 841 140 A2 | 5/1998 |
| JP | 61-027212 | 2/1986 |
| WO | 98/33948 * | 8/1998 |

OTHER PUBLICATIONS

International Search Report in PCT/DE01/02112 dated Mar. 7, 2002.
International Search Report in PCT/DE01/02112 dated Sep. 20, 2002.

* cited by examiner

*Primary Examiner*—Kuo-Liang Peng
(74) *Attorney, Agent, or Firm*—Marshall, Gerstein & Borun LLP

(57) ABSTRACT

A method of producing a permanent demoulding layer by plasma polymerisation on the surface of a mould, in which a gradient layer structure is created in the demoulding layer by varying the polymerisation conditions over time.

39 Claims, 1 Drawing Sheet

METHOD FOR PRODUCING A PERMANENT DEMOULDING LAYER BY PLASMA POLYMERIZATION ON THE SURFACE OF A MOULDED-PART TOOL, A MOULDED-PART TOOL PRODUCED BY SAID METHOD AND THE USE THEREOF

This is the U.S. national phase of International Application No. PCT/DE01/02112 filed Jun. 5, 2001, the entire disclosure of which is incorporated herein by reference.

The present invention relates to a method of producing a permanent demoulding layer by plasma polymerisation on the surface of a mould, a mould which can be made according to the method, and its use.

In engineering, it is of great importance that mouldings which have been shaped in a mould should be easy to remove from the mould; it goes without saying that it should be possible to remove the moulding without damaging it.

In order to facilitate demoulding, it is therefore customary to use separating agents.

In the state of the art, separating agent systems, in the form of solutions or dispersions for example, are known, which are normally sprayed onto the surface of the mould. These separating agent systems consist of active substances causing separation and a carrier medium, an organic solvent as a rule, such as hydrocarbons (in some cases also chlorinated), and water. When separating agent systems of this kind are sprayed on, they virtually always separate the moulding from the mould by a mixture of cohesive rupture and adhesive rupture, though in most cases some separating agent remains on the moulding to be demoulded. This can often lead to difficulties in further processing, e.g. in bonding, laminating, coating or metallising the moulding. It is therefore necessary to interpose a cleaning step, which causes additional expense. Furthermore, before every moulding step (or at least regularly) separating agents have to be applied to the surfaces of the moulds, which is likewise expensive and can lead to irregular demoulding results. Finally, these separating agent systems emit considerably quantities of solvents into the environment.

The state of the art also knows semi-permanent separating agents, as they are called, which offer longer service lives than the conventional separating agent systems described above, and are thus somewhat less expensive. Even with these semi-permanent separating agents, however, it is still necessary to add more separating agent from time to time, and the possibility can likewise not be ruled out that some separating agent will remain on the moulding to be demoulded. Furthermore, products available on the market do not separate polyurethane mouldings, or only do so with poor results.

Separating agent compositions are also known which can be added internally to the materials to be moulded; within the materials, they migrate to their interfaces and trigger the separation process at those interfaces. The use of these internal separating agent systems dispenses with the need for constantly applying the separating agent onto the moulds, as a result of which expense can be saved, and secondly productivity can be increased. When internal separating agent systems are used, however, there are usually difficulties with bonding, laminating, coating or metallising the demoulded mouldings because of the presence or emergence of the internal separating agent.

EP 084 11 40 A2 discloses a method of improving the release of the moulding from the mould, in which the surface energy has been reduced by means of a plasma coating. Plasma-polymeric layers with a low surface energy are already known, as is described in DE 195 431 33.2, for example. Such layers can be adjusted in such a way that cured plastic articles do not undergo any chemical reaction with the surface of the plasma-polymeric layers. Nevertheless, quite high adhesive forces can be observed, as a result of which it may happen that certain mouldings cannot be demoulded until the corresponding materials are completely cured, since otherwise the surface of the demoulded articles can be damaged. The separating effect and the productivity of the process are thus not satisfactory when such plasma-polymeric layers are used.

The object of the present invention is to overcome the disadvantages of the state of the art and to improve the generic method in such a way that plasma polymerisation creates a low-energy and actively separating surface on the moulds which is so stable that its properties are permanently preserved.

In addition, it is an object of the present invention to provide such a permanent demoulding layer and to enable its use.

In accordance with the invention, this object is achieved by varying the polymerisation conditions over time such that a gradient layer structure is created in the demoulding layer.

In this context, it is proposed that silicone compounds, fluorinated silicone compounds, hydrocarbons or at least partially fluorinated hydrocarbons, preferably at least one siloxane, and especially preferably hexamethyl disiloxane (HMDSO) and/or octamethyl trisiloxane, should preferably be used as precursors for the polymerisation reaction.

In one embodiment of the invention, it is also proposed that, in the plasma polymerisation process, gaseous oxygen or oxygen-containing gas, such as air, $CO_2$, $N_2O$, etc., is used, the concentration of the gaseous oxygen preferably being reduced during plasma polymerisation.

It is also envisaged that the conditions are selected such that less energy is introduced into the plasma than is necessary for the fragmentation of the precursor of the polymerisation reaction.

According to the invention, it is further provided that the conditions are selected such that a substantially closed coating is obtained on the surface of the mould.

Preferably, the demoulding layer formed will range between 1 nm and 10 μm, more preferably between 10 nm and 5 μm and most preferably between 100 nm and 1 μm in thickness.

In addition, it can also be provided for the plasma-polymerisation to be carried out in a period of from 1 second to 1 hour, preferably from 30 seconds to 30 minutes and most preferably from 3 minutes to 20 minutes.

In accordance with the invention. It is proposed that the surface of the mould should be treated with a gas plasma in order to clean and/or activate it before the plasma polymerisation process.

The invention further relates to a mould with a permanent demoulding layer, which can be produced in accordance with the invention, preferably with no highly interactive or reactive groups disposed on the surface of the demoulding layer.

Particularly preferably, it is envisaged that a high proportion of $CH_3$ and $CF_3$ groups should be present on the surface of the demoulding layer.

Finally, the invention also relates to the use of a mould according to the invention for moulding plastic articles, preferably articles of polyurethane, particularly preferably of polyurethane foam.

Figure 1:
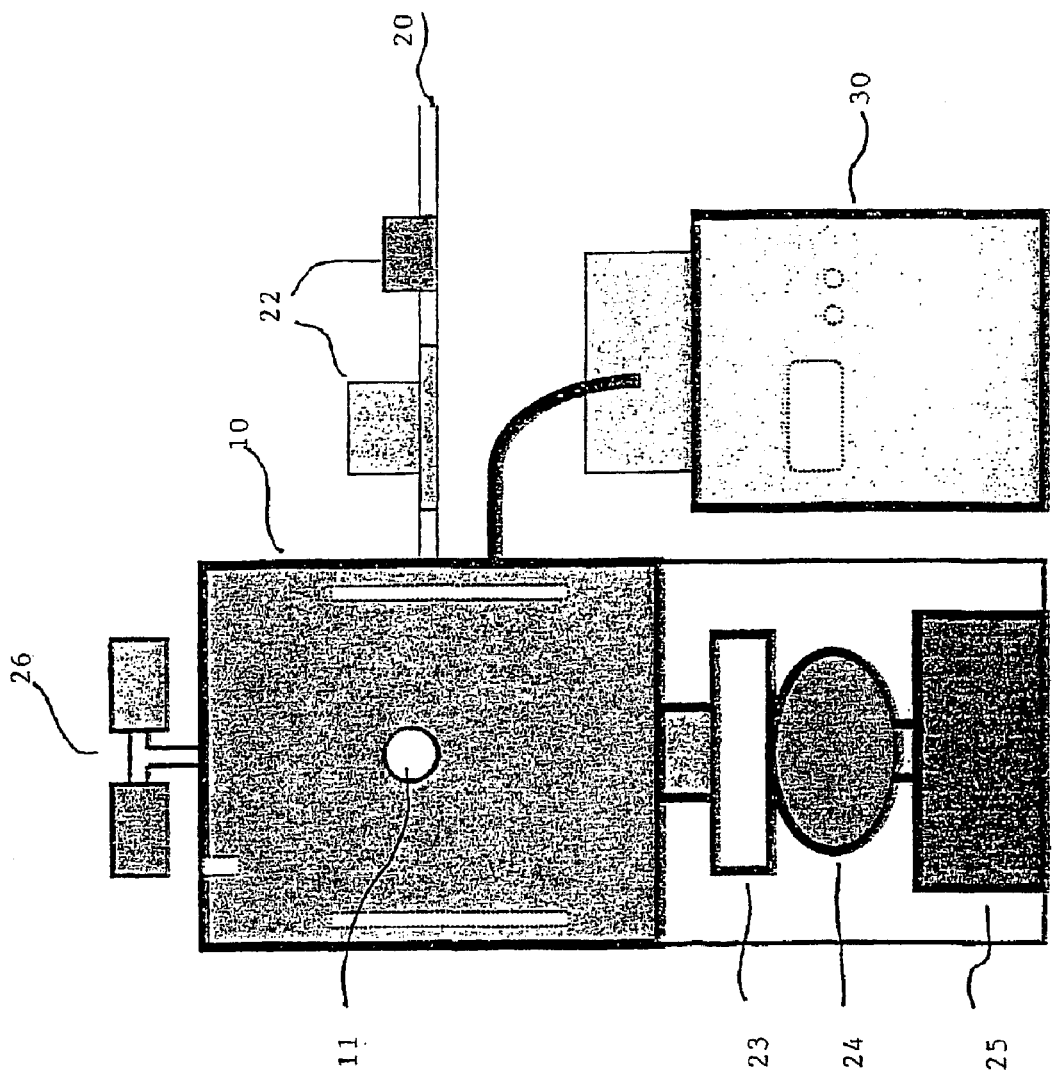
FIG. 1 shows a plasma polymerization unit for producing a permanent demoulding layer on the surface of a mould.

The object of producing an actively separating coating with an extraordinarily firm connection to the surface of the mould can be achieved, in accordance with the invention, in that, by varying the plasma polymerisation conditions over time, the separating effect in the layer structure increases towards the outside, i.e. towards the moulding (gradient layer structure).

The gradient layer structure of the separation layer ought thus to be designed such that a transition from adhesion promotion, in the form of a particularly stable base layer, on the surface of the mould to the actual separation layer is made possible in the direction of the moulding, with the separating effect increasing in that direction.

The invention is based on the surprising finding that, with the aid of the method of the invention, a demoulding layer can be made available which provides a surface that is both low-energy and separates actively. With a structure of this kind, it is, for example, possible to a great extent to even out small defects, such as those caused by mechanical influences, without rendering the demoulding layer unusable. The addition of external and/or internal separating agents is not necessary for this purpose; it is, however, possible to continue using them if it is intended to achieve certain additional effects with them, e.g. to influence the surface of the mouldings in a targeted way.

The demoulding layer produced by the method of the invention also makes it possible to remove the moulding from the moulds without damage, supplies the desired surface quality of the mouldings, such as the absence of flow defects, good surface structures, good feeling to the touch, etc. Furthermore, it makes a good finish possible, i.e. the demoulded mouldings can be further processed, such as by bonding, laminating, coating or metallising, without the interposition of a cleaning step. Any transfer from the moulding to the separation layer is avoided. The demoulding layer produced according to the method of the invention is environmentally compatible and inexpensive, since it constitutes a permanent separation layer.

The demoulding layer produced in accordance with the invention has proven resistant to conventional aromatic and non-aromatic solvents, such as benzene or isopropanol. The separation layer can therefore be readily and easily cleaned with cleaning benzene and a soft cloth. Furthermore, high temperature resistance has been observed, at least up to 200° C., and in some cases even higher. Thanks to the gradient layer structure of the separation layer, it can be used over a lengthy period despite any mechanical damage that might occur, without any impairment to the separating effect. In the case of severe damage, on the other hand, re-coating is also readily possible.

Plasma polymerisation is a process in which a vapour consisting of precursor molecules is subjected to a high-frequency electric discharge under the influence of ions, electrons and photons and forms fragments of molecules which, under defined framework conditions, lead to the formation of an amorphous, usually cross-linked polymer layer on a substrate. Plasma polymerisation differs from polymerisation in the conventional sense, where polymers are formed by chemical cross-linking, in that the starting material is first fragmented and then polymerised.

In the method of the invention, the amount of energy introduced into the plasma is important, since it is essential, in order to build up a gradient layer structure, that there should not be a complete fragmentation of the precursor molecules, which will be explained in more detail in the following with reference to an example.

The properties of the polymerised layers, e.g. their structure, hardness, density, separating effect, etc., are dependent on the operating parameters of the plasma unit, such as pressure, flow rate, power during discharge and the nature of the precursor molecules. By selecting the above-mentioned parameters appropriately and varying them over time, it is possible to achieve a situation in which, in the case of the polymerisation of organo-silicon compounds for example, the inorganic network is deposited (like glass) directly onto the surface of the mould, and the organic network is deposited continuously onto the inorganic network. In this way, optimum adhesion on the substrate and optimum permanent separating effect vis-à-vis the moulding is achieved (e.g. because of a high proportion of $CH_3$ and/or $CF_3$ moieties in the surface). Taking the example of hexamethyl disiloxane (HMDSO), the precursor structure (left) is compared with a possible (idealised and simplified) plasma-polymerised structure (right).

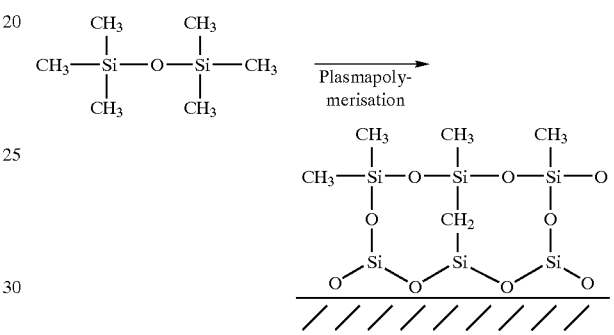

The siloxane dipoles point towards the interphase, while the free surface is covered by a dense packing of methyl groups, which result in a quasi-fluid layer that separates extremely actively.

When the amount of energy introduced is selected correctly, the first thing that happens is that most of the Si—C bonds are cleaved, but most of the Si—O bonds are preserved, which leads to the formation of an extremely stable $SiO_2$ base layer on the surface of the mould. For this purpose and for the further coupling to layers lying above it, it is also important to have a sufficient concentration of gaseous $O_2$. On this, again by selecting the correct amount of energy to be introduced, a layer structure, e.g. rich in methyl groups, is built up towards the free surface.

Other features and advantages of the invention will become apparent from the following description, in which working embodiments are explained in detail.

EXAMPLES

Substrates were coated by plasma polymerisation in a unit of the kind shown schematically in the accompanying drawing.

In the drawing, the actual reaction chamber is indicated by 10. For visual monitoring of the reaction, an inspection window 11 is provided. The precursor gases for the plasma polymerisation reaction are introduced via line 20, which is provided with gas control valves 22 (with cut-off valve). In order to create the low-pressure conditions in the reaction chamber, a Roots vacuum booster 24 and a vane-type rotary pump 25 are disposed beneath a cut-off valve 23. The pressure is measured via a pressure gauge unit 26. An HF generator 30 with an adaptation network is provided to introduce the energy into the plasma.

In the experiments conducted, a reaction chamber with the dimensions 65 cm/78 cm/70 cm (height/width/depth), with a total volume of 355 litres and a useful volume of 115 litres was used. The excitation frequency was 13.56 MHz with a maximum HF power of 2,500 W. The pump power was 400 m³/h at 0.3 mbar.

For the substrates, test moulds made from an $AlMg_3$ alloy were used. The plates were 10 mm thick and had edges 100 mm long with a milled off surface of defined roughness. Before the coating was applied by plasma polymerisation, the test moulds underwent conventional cleaning.

The test series showed that low-energy surfaces, i.e. those which have a water wetting angle of >100° on smooth substrates, can be produced in the unit described with a gaseous mixture of hexamethyl disiloxane (HMDSO) and oxygen at a gas flow ratio of from 1/0 to 1/4. With the unit described, permanent separation layers result with the above-mentioned mixture of gases especially at a gas flow ratio of from 4.1/1 to 5.7/1 and a generator power of between 500 and 650 W when the last layer(s) is/are applied.

Example 1

Test moulds were coated by plasma polymerisation according to the protocol shown in Table 1.

TABLE 1

|  | Gas type | Gas flow [cm³/min] Step 1 | Step 2 | Step 3 |
|---|---|---|---|---|
| Gas 1 | $O_2$ | 100 |  | 9 |
| Gas 2 | HMDSO |  | 20 | 52 |
| Gas 3 | $H_2$ | 500 | 80 |  |
| Power (W) |  | 1000 | 1500 | 600 |
| Time (s) |  | 150 | 60 | 1200 |

TABLE 1-continued

|  | Gas type | Gas flow [cm³/min] Step 1 | Step 2 | Step 3 |
|---|---|---|---|---|
| Pressure Ba (mbar) |  | 0.096 | 0.047 | 0.034 |

Example 2

Test moulds were coated by plasma polymerisation according to the protocol shown in Table 2.

TABLE 2

|  | Gas type | Gas flow [cm³/min] Step 1 | Step 2 | Step 3 |
|---|---|---|---|---|
| Gas 1 | $O_2$ | 100 |  | 12 |
| Gas 2 | HMDSO |  | 20 | 50 |
| Gas 3 | $H_2$ | 500 | 80 |  |
| Power (W) |  | 1000 | 1500 | 600 |
| Time (s) |  | 150 | 60 | 1200 |
| Pressure Ba (mbar) |  | 0.093 | 0.046 | 0.033 |

Example 3

Test moulds were coated by plasma polymerisation according to the protocol shown in Table 3.

TABLE 3

|  | Gas type | Step 1 | Step 2 | Step 3 | Step 4 | Step 5 | Step 6 | Step 7 | Step 8 |
|---|---|---|---|---|---|---|---|---|---|
| Gas 1 | $O_2$ | 100 | 100 | 100 | 50 | 23 | 23 | 16 | 9 |
| Gas 2 | HMDSO |  |  | 5 | 10 | 46 | 46 | 49 | 52 |
| Gas 3 | $H_2$ | 500 | 100 |  |  |  |  |  |  |
| Power (W) |  | 1000 | 2000 | 2300 | 1100 | 1100 | 500 | 500 | 600 |
| Time (s) |  | 300 | 60 | 60 | 60 | 300 | 300 | 300 | 300 |
| Pressure Ba (mbar) |  | 0.093 | 0.061 | 0.059 | 0.047 | 0.044 | 0.040 | 0.035 | 0.33 |

Example 4

Test moulds were coated by plasma polymerisation according to the protocol shown in Table 4.

TABLE 4

|  | Gas type | Step 1 | Step 2 | Step 3 | Step 4 | Step 5 | Step 6 |
|---|---|---|---|---|---|---|---|
| Gas 1 | M5515* | 0 | 0 | 0 | 0 | 0 | 15 |
| Gas 2 | $O_2$ | 100 | 100 | 100 | 50 | 23 | 15 |
| Gas 3 | HMDSO | 0 | 0 | 5 | 10 | 46 | 0 |
| Gas 4 | $H_2$ | 500 | 100 | 0 | 0 | 0 | 0 |
| Power (W) |  | 1000 | 2000 | 2300 | 1100 | 1100 | 1000 |
| Time (s) |  | 300 | 60 | 60 | 60 | 300 | 60 |
| Pressure Ba (mbar) |  | 0.85 | 0.056 | 0.049 | 0.036 | 0.041 | 0.052 |

*M5515-0ctamethyl trisiloxane

The coated test moulds were examined and their demoulding characteristics tested. For this purpose, the coated plates were treated with an external separating agent on the sides and underside. Care was taken to avoid wetting the coated upper surface in the process. A flexible foam plate mould (200×200×20 mm) was likewise sprayed with the separating agent and heated at a flow temperature of 60° C. The test plate was placed on the bottom of the mould, and the free space at the sides was filled out with blanks of flexible polyurethane foam. The plate was tempered to approx. 50° C., measured on the coated surface.

Then a polyurethane foam system (Lagopur COC, 198, ex LAGOMA) was applied to the test plate. For this purpose, 50 g polyol and a corresponding amount of isocyanate were used. After 5 minutes' reaction time, the part was removed and the separating effect of the coated surface was assessed. If the separating effect was good, the procedure was repeated until such time as either the separating effect declined or it could be assumed that there was a permanent separting effect (at least 10 parts).

The separating effect was assessed in accordance with the following pattern:

TABLE 5

| | |
|---|---|
| 1 | Part sticks firmly in the mould |
| 2 | Part can only be removed from the mould with effort |
| 10 | Part must be removed by pulling hard |
| 20 | Part can be removed by pulling gently |
| 30 | Part can be removed very easily without any effort |

The results illustrating the separating effect of the permanent coatings described in Examples 1 to 4 are shown in the following Table 6.

TABLE 6

| Separating effect | 1st demoulding | 2nd–5th demouldings | 6th–10th demouldings |
|---|---|---|---|
| Example 1 | 30 | 20 | 20 |
| Example 2 | 30 | 30 | 20 |
| Example 3 | 30 | 20 | 20 |
| Example 4 | 30 | 20 | 20 |

In all cases, the desired surface characteristics were obtained. No residues from the parisons could be found on the coating.

The permanence of the separation layers produced by plasma polymerisation was checked using a surface-analytical method (ESCA (Electron Spectroscopy for Chemical Analysis)). This showed that there was no significant transfer of the characteristic element of the separation layer (Si) to the component to be demoulded. The fact that lasting use can be made of the separating effect, and the demonstration that the demoulding layer is not itself consumed by wear is evidence of the permanence of the coating.

The features of the invention disclosed in the above description and in the claims can be essential to implementing the invention in its various embodiments both individually and in any combination.

What is claimed is:

1. A method of producing a permanent demoulding layer by plasma polymerisation on the surface of a mould comprising creating a gradient layer structure in the demoulding layer by varying polymerisation conditions over time during the plasma polymerisation process, wherein the method comprises using a member selected from the group consisting of silicon compounds, fluorinated silicone compounds, hydrocarbons and at least partially fluorinated hydrocarbons as a precursor or the polymerization reaction.

2. The method as claimed in claim 1, comprising using at least one siloxane as the precursor for the polymerisation reaction.

3. The method as claimed in claim 2, comprising using at least one of hexamethyl disiloxane (HMDSO) and octamethyl trisiloxane as a precursor for the polymerisation reaction.

4. The method as claimed in claim 1, comprising using gaseous oxygen or oxygen-containing gas in the plasma polymerisation process.

5. The method as claimed in claim 4, comprising reducing the concentration of gaseous oxygen or oxygen-containing gas during plasma polymerisation.

6. The method as claimed in claim 1, comprising selecting conditions such that less energy is introduced into the plasma than is necessary for fragmentation of a precursor of the polymerisation reaction.

7. The method as claimed in claim 1, comprising selecting the conditions such that a substantially closed coating is obtained on the surface of the mould.

8. The method as claimed in claim 1, wherein the thickness o the demoulding layer formed ranges between 1 nm and 10 $\mu$m.

9. The method as claimed in claim 1, wherein the plasma polymerisation is carried out in a period of from 1 second to 1 hour.

10. The method as claimed in claim 1, comprising treating the surface of the mould with a gas plasma in order to clean and/or activate said surface before the plasma polymerisation process.

11. A process comprising moulding plastic articles in a mould as claimed in claim 10.

12. A process as claimed in claim 11, wherein said plastic comprises polyurethane.

13. A process as claimed in claim 12, wherein said polyurethane comprises polyurethane foam.

14. A mould with a permanent demoulding layer produced in accordance with a method as claimed in claim 1.

15. The mould as claimed in claim 14, wherein there are no highly interactive or reactive groups disposed on the surface of the demoulding layer.

16. The mould as claimed in claim 15, wherein there is a high proportion of $CH_3$ and $CF_3$ groups on the surface of the demoulding layer.

17. The method as claimed in claim 1, wherein the thickness of the demoulding layer formed ranges between 10 nm and 5 $\mu$m.

18. The method as claimed in claim 1, wherein the thickness of the demoulding layer formed ranges between 100 nm and 1 $\mu$m.

19. The method as claimed in claim 1, wherein the plasma polymerisation is carried out in a period of from 30 seconds to 30 minutes.

20. The method as claimed in claim 1, wherein the plasma polymerisation is carried out in a period of from 3 minutes to 20 minutes.

21. A method of producing a permanent demoulding layer, comprising:
    conducting plasma polymerization in the presence of a gas selected from the group consisting of gaseous oxygen, air, carbon dioxide, and nitrous oxide, to form a demoulding layer comprising a gradient layer structure on the surface of a mould; and, varying polymerisation conditions over time during the plasma polymerisation process, wherein the method comprises using a member selected from the group consisting o silicon compounds, fluorinated silicone compounds, hydrocarbons and at least partially fluorinated hydrocarbons as a precursor for the polymerization reaction.

22. The method as claimed in claim 21, comprising using at least one siloxane as the precursor for the polymerisation reaction.

23. The method as claimed in claim 21, comprising using at least one of hexamethyl disiloxane (HMDSO) and octamethyl trisiloxane as a precursor for the polymerisation reaction.

24. The method as claimed in claim 21, comprising reducing the concentration of the gas during plasma polymerisation.

25. The method as claimed in claim 21, comprising selecting conditions such that less energy is introduced into the plasma than is necessary for fragmentation of a precursor of the polymerisation reaction.

26. The method as claimed in claim 21, comprising selecting the conditions such that a substantially closed coating is obtained on the surface of the mould.

27. The method as claimed in claim 21, wherein the thickness of the demoulding layer formed ranges between 1 nm and 10 $\mu$m.

28. The method as claimed in claim 21, wherein the plasma polymerisation is carried out in a period of from 1 second to 1 hour.

29. The method as claimed in claim 21, comprising treating the surface of the mould with a gas plasma in order to clean and/or activate said surface before the plasma polymerisation process.

30. A comprising moulding plastic articles in a mould as claimed in claim 29.

31. A method as claimed in claim 30, wherein said plastic comprises polyurethane.

32. A method as claimed in claim 31, wherein said polyurethane comprises polyurethane foam.

33. A mould with a permanent demoulding layer produced in accordance with a method as claimed in claim 21.

34. The mould as claimed in claim 33, wherein there are no highly interactive or reactive groups disposed on the surface of the demoulding layer.

35. The mould as claimed in claim 34, wherein there is a high proportion of $C_3$ and $CF_3$ groups on the surface of the demoulding layer.

36. The method as claimed in claim 21, wherein the thickness of the demoulding layer formed ranges between 10 nm and 5 $\mu$m.

37. The method as claimed in claim 21, wherein the thickness of the demoulding layer formed ranges between 100 nm and 1 $\mu$m.

38. The method as claimed in claim 21, wherein the plasma polymerisation is carried out in a period of from 30 seconds to 30 minutes.

39. The method as claimed in claim 21, wherein the plasma polymerisation is carried out in a period of from 3 minutes to 20 minutes.

\* \* \* \* \*